United States Patent

[11] 3,557,907

| | | |
|---|---|---|
| [72] | Inventor | Garth Close<br>Lubbock, Tex. |
| [21] | Appl. No. | 831,368 |
| [22] | Filed | June 9, 1969 |
| [45] | Patented | Jan. 26, 1971 |
| [73] | Assignee | United Steel and Wire Company<br>Battle Creek, Mich.<br>a corporation of Michigan |

[54] CHECKOUT COUNTER WITH PIVOTED CASH REGISTER
9 Claims, 7 Drawing Figs.

[52] U.S. Cl. .................................................. 186/1
[51] Int. Cl. .................................................... E04h 3/04
[50] Field of Search .......................................... 186/1, 1.1, 1.1C

[56] References Cited
UNITED STATES PATENTS
2,964,134  12/1960  Bisen .......................... 186/1(.1)

*Primary Examiner*—Harvey C. Hornsby
*Attorney*—Woodhams, Blanchard and Flynn

ABSTRACT: A checkstand system having a pair of spaced-apart counters which define a shopping cart unloading zone so arranged that a patron may push one of the shopping carts into the unloading zone for purposes of having the merchandise therein removed from the shopping cart, checked by the cashier and placed on the first counter. A cash register is mounted on the second counter and is supported for pivotal movement toward the shopping cart unloading zone for positioning the cash register close to the shopping cart to permit the cashier from a single work station to (1) remove the selected merchandise from the shopping cart, (2) register the cost thereof on the cash register and (3) place same on the first counter. The cash register is then pivotable away from the shopping cart unloading zone for removing same from the position closely adjacent the shopping cart. This permits the shopping cart then to move through the space between the first and second counters to remove it from the unloading zone and permits the next shopping cart to be received into the unloading zone.

PATENTED JAN 26 1971 3,557,907

INVENTOR.
GARTH CLOSE
BY
Wordhams, Blanchard & Flynn
ATTORNEYS

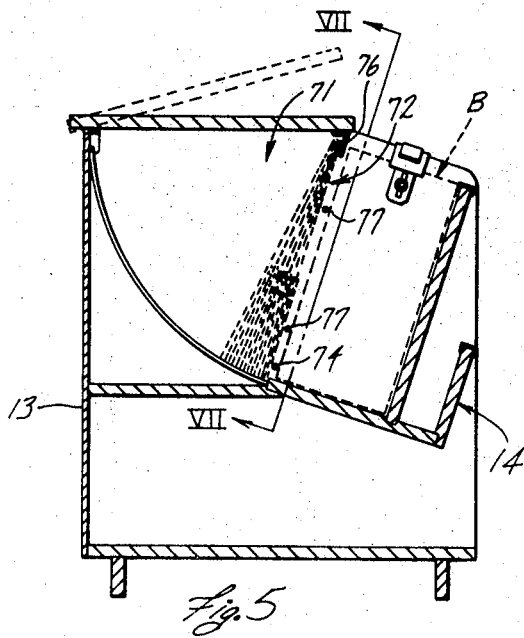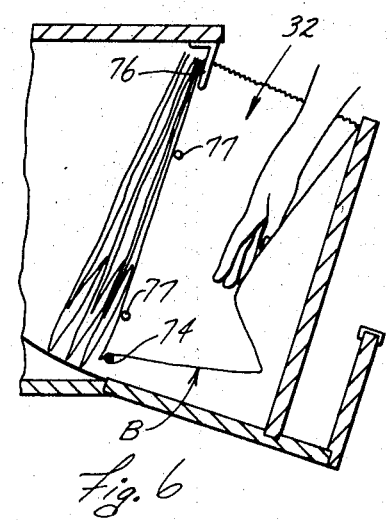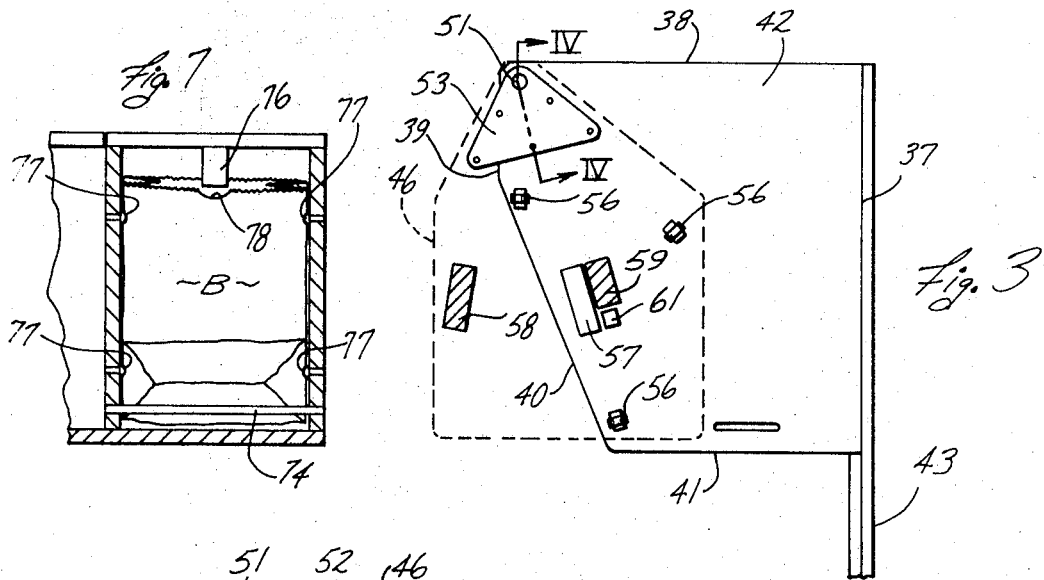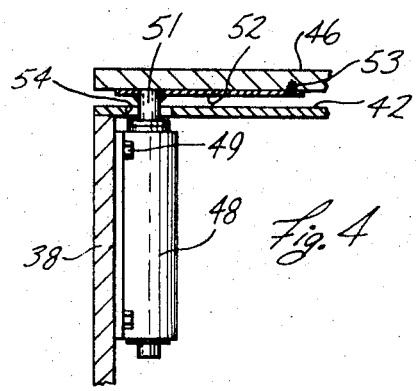

CHECKOUT COUNTER WITH PIVOTED CASH REGISTER

FIELD OF THE INVENTION

This invention relates to a checkstand and, more particularly, relates to a checkstand system having a pair of counters which are spaced apart a distance equal to the width of a shopping cart and having a cash register pivotally mounted on one of the counters for movement toward and away from the other counter for purposes of positioning the cash register close to a shopping cart which is between the pair of counters for unloading by the cashier.

BACKGROUND OF THE INVENTION

It has long been recognized in the operation of retail establishments of the supermarket type that an important factor of profitably operation is the easy and rapid flow of both merchandise and customers therethrough. Accordingly, great efforts have in the past been made, and are still being made, to promote such ease and rapidity of flow. Much of the equipment supplied for such retail establishments and, in fact, much of the design of such establishments themselves have been directed toward this end. However, a serious bottleneck has continued to exist at the checkout stand and this has been the source of frequent and often irritating delays for the customer. Accordingly, equipment which will tend to speed the flow of customers and merchandise past the checkstand will be advantageous.

Most of the equipment which has thus far been designed to speed the flow of customers and merchandise past the checkstands has involved the use of apparatus for aiding the customer in removing the merchandise from the shopping cart. This apparatus has taken many forms but in all thereof special cart and/or customer constructions are required which are expensive and not always fully satisfactory. Further, in present systems, with or without means for speeding the unloading of the carts, the cashier must often have an assistant to help with the bagging of the merchandise. If such assistant is not available, the cashier will then with nearly every customer have to discontinue the checking of the merchandise and proceed to the area of the checkstand wherein the bagging of merchandise is to take place. In such instances, the speeding of the unloading process is to no avail and the customers waiting in the checkout line are still irritated. Further, this necessity for the cashier to move to the bagging station will in many cases require that she moves a substantial distance from the cash register and checkout area, thus creating possibilities for pilfering from the cash register or for shoplifting of the small articles which are often adjacent the cash register. Accordingly, it will be advantageous to provide equipment which will tend to reduce the need for a cashier to have an assistant for bagging the merchandise and which will, even when the cashier is required to bag, both speed the process and minimize the distance she must move from the cash register.

A still further problem arising from checkout counters as presently designed is that the goods, following checking by the cashier, are usually spread out on a single surface at the end of the checkout counter at a point beyond the cashier. This is true regardless of whether the cashier or an assistant does the bagging. Because of the erratic manner in which groceries are necessarily pushed into this area by the cashier, it has been found that even with a large such area, such as 12—16 square feet, it is seldom that the groceries to fill more than three or four bags can be received thereon. Thus, for a customer who has a very large order and if the cashier is also doing the bagging, it is often necessary that for the cashier to stop checking partway through the checking operation to bag the groceries which are then occupying the bagging area and then only after such bagging is finished is she able to return to the checking operation.

Thus, it is desirable to provide a system by which the groceries, inasmuch as they must be handled once by the cashier anyway in the checking process, can be placed directly into suitable bags and thus avoid a second handling. Further, the relatively large bagging space required in present designs of checkout counters are wasteful of expensive store floor space and, hence, it would be advantageous to provide, if possible, means for carrying out the bagging operation which will handle a larger number of bags of groceries than is presently convenient and yet do so in an actually smaller space than is now required.

In those systems which require that the patron manually remove the merchandise from the shopping cart, the patron is unable conveniently to watch the cashier check the merchandise to doublecheck against errors. However, where the cashier removes the merchandise from the cart, it is necessary for the cart to pass on the cashier's side of the counter, and thence to the storage area. This in itself is common practice in some areas and, while possessed of certain advantages in many respects, has the disadvantage of placing the cash register an inconvenient distance from the checking counter in order to provide space for the cart to go therebetween. This distance becomes particularly inconvenient if the cashier, as often happens must, in addition to unloading the cart and checking the merchandise, also carry out the bagging operation. These difficulties and inconveniences of presently known system of this nature are sufficiently well recognized that no further elaboration thereof is needed but they have been tolerated partly for the advantage of keeping the customer aisle clear of carts and partly for the advantage of enabling the cashier to control the unloading of the cart. Nevertheless, it would be highly advantageous if a system could be developed by which the cart would still pass between the checking counter and the cash register in order to obtain the advantages above recognized of having the cashier control the unloading of the cart, which would retain the presently well-known advantages of having the cart pass between the checking counter and the cash register and would yet bring the cash register station, the cart and the bagging station into sufficiently close proximity to each other to enable the cashier to unload the cart, check and bag the merchandise all from a single station.

Accordingly, the objects of this invention are:

1. To provide apparatus for use in retail establishments of the supermarket type which will tend to increase the speed and convenience of flow of both patrons and merchandise therethrough.

2. To provide apparatus, as aforesaid, which will tend to increase the rate of flow of patrons and merchandise through the checkout portion of such establishments.

3. To provide apparatus, as aforesaid, which will permit the continued use of shopping carts already in existence in the retail establishments of the supermarket type and will not require the need for special shopping cart designs in order to cooperate with the checkstand system embodying the invention.

4. To provide apparatus which will permit the cashier to unload a shopping cart, and, therefore, permit the patron to watch the cashier check the merchandise in order to doublecheck against errors in the checking process.

5. To provide apparatus which will permit the cashier to control the shopping carts after same have been unloaded to prevent a patron from moving same out into the area where the incoming patrons pass and thereby eliminating the congestion of shopping carts around the patron entrance area.

6. To provide apparatus which will reduce, or eliminate, the necessity for a cashier to have an assistant for the purpose of bagging the merchandise which has been checked, thereby reducing the overhead for the operation of the retail establishments.

7. To provide apparatus, as aforesaid, which will retain the advantages of having the shopping cart pass for unloading between the cash register and the checking counter but which will nevertheless enable the cashier to unload the cart, check the merchandise and either place same on the counter or bag same, all from a single working station.

Other objects and purposes of this invention will become apparent to persons acquainted with checkstand apparatus of this general type upon reading the following specification and inspecting the accompanying drawings, in which:

FIG. 3 is a sectional view taken along the line III–III of FIG. 2; and

FIG. 4 is a sectional view taken along the line IV–IV of FIG. 3;

FIG. 5 is a sectional view taken on the line V–V of FIG. 1;

FIG. 6 is a view on the same section showing a step in the use of the apparatus;

FIG. 7 is a sectional view taken along the line VII–VII in FIG. 5.

Figure 1:
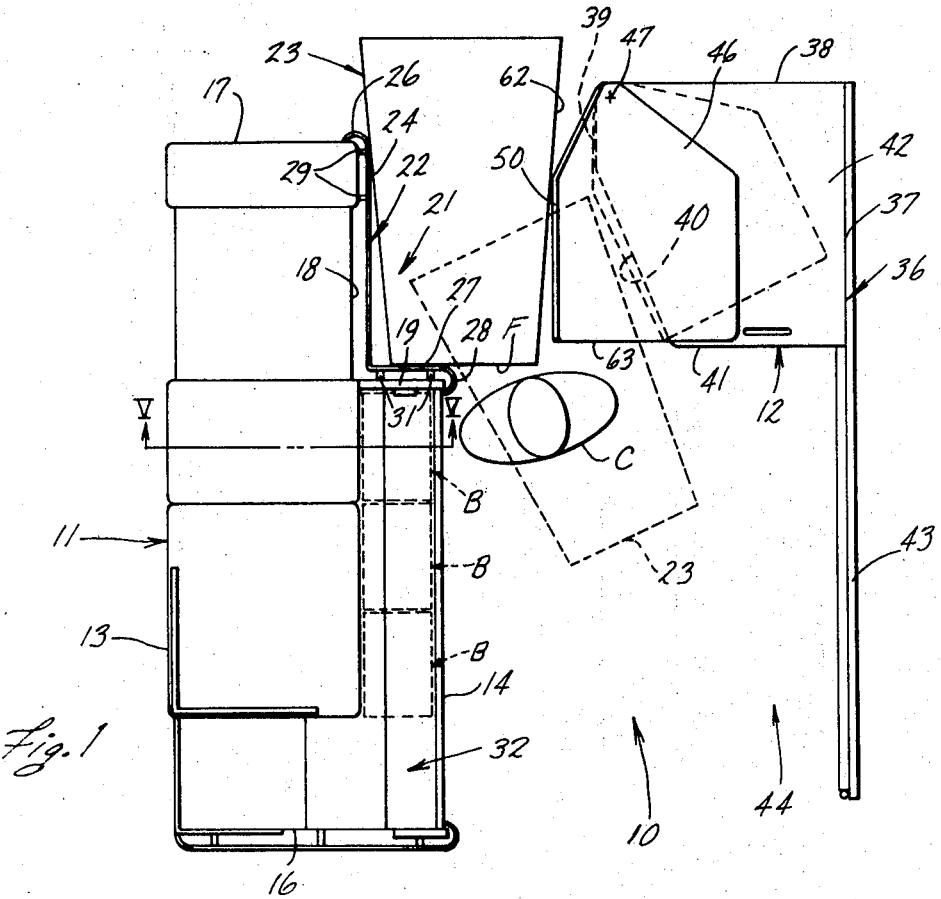
FIG. 1 is a top view of the checkstand system embodying the invention.

Certain terminology will be used in the following description for convenience in reference only and will not be limiting. The words "up," "down," "right" and "left" will designate directions in the drawing to which reference is made. The words "in" and "out" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a checkstand system which has first and second counters defining a shopping cart unloading zone, which counters are spaced apart a distance equal to the width of a shopping cart. A cash register mounted on one of the counters for movement toward and away from the shopping cart unloading zone. Thus, during the unloading operation, the cash register may be placed close to the shopping cart so that the cashier can remove the selected merchandise from the shopping cart, register the cost thereof on the cash register and place same on the first counter and thereafter the cash register may be moved away from the first counter a distance sufficiently to permit the shopping cart to pass therebetween to a zone of storage and/or further use.

DETAILED DESCRIPTION

The checkstand system 10 embodying the invention comprises a pair of spaced-apart counters 11 and 12. The counter 11 has sidewalls 13 and 14 and end walls 16 and 17. A sidewall 18 adjacent the end wall 17 is in this embodiment offset from the sidewall 14 and a wall section 19 interconnects the sidewall 14 to the sidewall 18. In this particular embodiment, the sidewall 18 and wall section 19 are at right angles to each other to define an L-shaped zone referred to hereinafter as a shopping cart unloading zone 21.

An L-shaped guide rail 22 for guiding a shopping cart 23 into the shopping cart unloading zone 21 comprises a leg 24 which is generally parallel with the wall 18 and is bent around as at 26 so that the end thereof abuts against the end wall 17. A leg 27 of the guide rail 22 is secured to the other end of the leg 24 and extends generally parallel with the wall 19 and is bent around as at 28 so that the end thereof abuts against the wall 14. In this particular embodiment, the leg 24 is spaced from the wall 18 by spacers 29 and the leg 27 is spaced from the wall 19 by spacers 31. The spacers 29 and 31 also serve to secure the legs 24 and 27, respectively, of the guide rail 22 to the counter 11.

A trough 32 is provided on the counter 11 and extends generally parallel with the wall 14 between the end wall 16 and the wall 19. Said trough opens upwardly, is preferably inclined somewhat toward the wall 14 as shown and is of such width and depth as to receive all or most of a selected size of grocery-carrying bag. Further, if desired, and preferably for obtaining the full benefit of the present invention, there is also provided within said counter a bag storage compartment 71 (FIG. 5) having an opening 72 between said compartment and the trough 32. Some form of dispensing or metering device will be provided at least adjacent said opening, both to assist the cashier in withdrawing only one bag at a time from said storage compartment and, further if desired, to assist the cashier in opening said bag as it is withdrawn from said storage compartment. In the embodiment shown, a rail 74 is provided across the lower end of the opening 72. A hook 76 projects downwardly from the upper edge of said opening and, if desired, a plurality of buttons 77 are provided at both sides of the opening. A bag B (FIG. 6) which is being withdrawn from the storage compartment is first lifted upwardly sufficiently to clear the rail 74. This causes the hook 76 which is passed through a cutout recess 78 (FIG. 8) in the upper end of the leading face of the bag to engage the trailing face. The cashier extends her hand well into said bag and pulls the leading face toward her. This draws the first folded portion of the bag past the buttons 77 but due to the bellows effect of the folded bag, the second edges thereof tend to catch on the buttons 77 and temporarily hold same while the bag opens. As the bottom of the bag clears the rod 74, the bag drops downwardly, or at least does so after some merchandise has been placed thereinto and thereby clears the retainer 76. The detailed construction of the trough, the storage compartment 71, the dispensing or metering means 77 above mentioned and the relationship of all of those parts with respect to each other and with respect to the other components of the counter 11 are the subject matter of my copending application Serial No. 809,578, filed Mar. 24, 1969 and reference is to be had to that application for further details concerning the construction thereof.

The counter 12 comprises a base 36 having sidewalls 37, 38, 39, 40 and 41 and a top wall 42. The counter 12 is located adjacent an end of the counter 11 opposite the shopping cart unloading zone 21 and is spaced from the counter 11 a distance sufficient to permit a shopping cart to pass therebetween but no greater than necessary for such purpose. Such distance is elsewhere herein referred to as a distance at least as great as the width of a shopping cart although it will be understood that such reference must be interpreted as meaning the width of the shopping cart plus a sufficient clearance distance to enable the shopping cart to pass conveniently therebetween. In this particular embodiment, the wall 39 of the counter 12 is parallel to the wall 18 of the counter 11 and the wall 41 is parallel with the wall 19. The wall 40 which interconnects the walls 39 and 41 serves to remove the right-angle corner which would result if the walls 39 and 41 were connected together. The wall 40 is spaced from the bond 28 in the leg 27 of the guide rail 22 a distance at least equal to the width of a shopping cart 23 plus the necessary clearance distance as above mentioned. Also, in this particular embodiment, a partition 43 is secured to the wall 37 and extends generally parallel therewith and terminates adjacent the plane defined by the wall 16 to define an area 44 for the cashier C.

Figure 2:
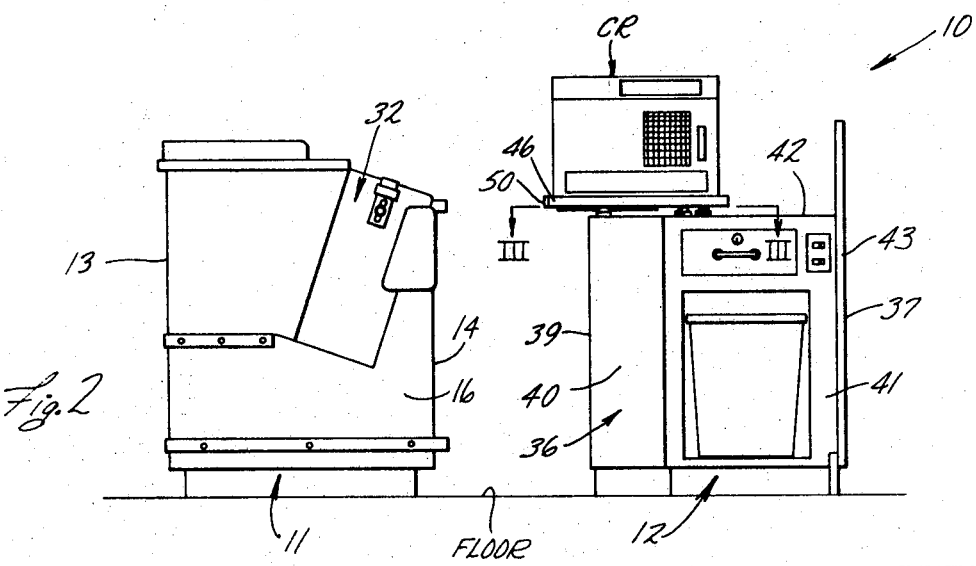
FIG. 2 is an end elevational view of the checkstand system.

The cashier C is positioned within the area 44 closely adjacent the front F of the shopping cart 23 between the bend 28 of the guide rail 22 and the wall 40 of the counter 12. The location of the cashier C in this position will permit the cashier to remove the merchandise from the shopping cart simultaneously with an operation of a cash register CR (FIG. 2).

In this particular embodiment, a bearing housing 48 (FIG. 4) is secured to the wall 38 of the counter 12 by a plurality of screws, one of which is indicated at 49. The bearing housing 48 rotatably supports a vertically oriented shaft 51 which defines a pivot axis 47 (FIG. 1). The shaft 51 extends through an opening 54 in the top wall 42. A plate 52 is secured to the upper end of the shaft 51 by any convenient means such as welding above the top wall 42 and the plate 52 in turn is secured to a platform 46 by a plurality of screws, one of which is indicated at 53. A wear plate 50 is secured to the edge of the platform 46.

A cash register CR is mounted on the platform 46 between the forward edge 63 thereof and the pivot axis 47. The cash register CR is anchored to the platform 46 and is pivotable therewith.

A plurality of rotatable bearings 56 are supported on the top wall 42 of the counter 12 and have axes which intersect the pivot axis 47. The bearings 56 project above the top wall 42 as illustrated in FIG. 2 and serve to support the platform 46. A block 57 (FIG. 3) is secured to the top wall 42 and is preferably made of a magnetic metal.

A pair of blocks 58 and 59 (FIG. 3) are secured to the underside of the platform 46 on opposite sides of the magnetic block 57 to limit the extent to which the platform 46 is pivotable. In this particular embodiment, a magnet 61 is secured to the underside of the platform 46 adjacent the block 59 so that when the block 59 comes into engagement with the block 57, the magnet 61 will become magnetically coupled to the block 57 and will hold the platform 46 in the positions illustrated in dotted lines in FIG. 3 and in solid lines in FIG. 1.

OPERATION

The operation of the device embodying the invention will be described in detail hereinbelow for a better understanding of the invention.

As indicated above, the checkstand system embodying the invention is for use in self-service stores which have shopping carts supported on wheels for use by patrons in accumulating merchandise from different parts of the store and for transportation of the selected merchandise to the checkstand system for checking by the cashier. Assuming that a selection of merchandise has been completed, the patron will then proceed to the checkout area and position the shopping cart 23 into the shopping cart unloading zone 21 between the counters 11 and 12. This is accomplished by pushing the front of the cart F into the zone 21 until it engages the leg 27 of the guide rail 22. The shopping cart 23 does not necessarily have to engage the leg 24 of the guide rail 22 because the pivotable casters on the shopping cart are usually located at the front end thereof. Thus, if the front left-hand corner of the cart 23 (FIG. 1) engages the leg 27 of the guide rail 22 adjacent the bend 28, the cashier C can then move the front end of the cart leftwardly to the desired position.

Once the shopping cart 23 has been placed into the unloading zone 21, the platform 46 can be pivoted by the cashier about the pivot axis 47 from the dotted-line position illustrated in FIG. 1 to the solid-line position. The wear plate 50 secured to the edge of the platform 46 will engage the sidewall 62 of the shopping cart 23 to further orient and position the cart within the unloading zone 21. The platform 46 will pivot until the block 59 thereon engages the block 57 on the top wall of the counter 12. In this position, the magnet 61 will become magnetically coupled to the magnetic block 57 to hold the platform 46 in the solid-line position illustrated in FIG. 1. In this position, the cash register CR mounted on the platform 46 will be positioned closely adjacent the shopping cart 23 to permit the cashier C to operate same simultaneously with the removal of the merchandise from the cart.

If desired the cashier C may place the merchandise in a conventional storage area on the top of the counter 11 for subsequent bagging, either by herself or by an assistant. However, if preferred, and for utilizing the full scope of advantages of the present invention, a plurality of bags can be provided in the trough 32 in the manner described in detail in my above-mentioned copending application, and the cashier can then place the merchandise into the bags simultaneous with a checking thereof to thereby eliminate the need for an assistant to effect the bagging of the checked merchandise. When a bag is filled, the filled bag can be slid along the trough 32 to make room for another bag closely adjacent the wall 19. Three such bags have been indicated in dotted lines in the trough 32 in FIG. 1.

When the cart has been completely emptied by the cashier, and the checking procedure has been completed, the platform 46 can be pivoted about the pivot axis 47 from the solid-line position of FIG. 1 to the dotted-line position by manually breaking the coupling between the magnet 61 and the block 57. The platform 46 will pivot counterclockwise until the block 58 engages the block 57. Thus, the cashier C can then pull the cart 23 from the unloading zone 21 through the gap between the bend 28 and the wall 40 of the counter 12.

Since the bagged merchandise is closely adjacent the cart which has been removed from the unloading zone, the cashier can, if desired, then place the bagged and checked merchandise into the cart to assist the patron in removing the merchandise from the store. Simultaneously therewith, the next shopping cart filled with selected merchandise can be placed into the unloading zone 21 and the process is ready to repeat.

Although a particular preferred embodiment of the invention has been disclosed in detail for illustration purposes, it will be recognized that variations or modifications of the disclosed apparatus, including the rearrangement of parts, lie within the scope of the present invention.

I claim:

1. In a checkstand system for self-service stores which have shopping carts supported on wheels for use by patrons in accumulating merchandise from different parts of the store and for transportation of the selected merchandise to the checkstand system for checking by a cashier, the combination comprising:

first counter means for receiving the selected merchandise from said shopping carts;

second counter means spaced from said first counter means a distance equal to at least the width of one of said shopping carts, the space between said counters defining a shopping cart unloading zone whereby said patron may push one of said shopping carts into said zone for purposes of having the selected merchandise therein removed from said one shopping cart, checked by said cashier and placed on said first counter means;

a cash register supporting means mounted on said second counter means and arranged for pivotal movement toward said zone to position said cash register closely adjacent said shopping cart to permit said cashier to remove the selected merchandise from the shopping cart, register the cost thereof on said cash register and place same on said first counter means, said supporting means being then pivotal away from said shopping cart unloading zone for removing said cash register from said position closely adjacent said shopping cart to permit said shopping cart to move through said spacing between said first counter means and said second counter means for removal thereof from said unloading zone.

2. The checkstand system defined in claim 1, wherein said shopping cart unloading zone comprises a recess in said first counter means open on at least two sides, one of said open sides defining an entrance for said shopping carts into said unloading zone and the other of said open sides defining an exit from said unloading zone.

3. The checkstand system defined in claim 1, wherein said second counter means comprises a stationary base spaced from said first counter means said distance equal to at least the width of said one shopping cart and said supporting means includes a platform pivotably secured to said stationary base, said platform having said cash register mountable thereon and pivotable therewith.

4. The checkstand system defined in claim 3, including at least one stop for limiting the pivotal movement of said platform.

5. The checkstand system defined in claim 4, including bearings mounted on said base for supporting said platform for pivotal movement.

6. The checkstand system defined in claim 4, including magnetic coupling means mounted on said base and said platform for coupling said platform to said base when said platform is positioned closely adjacent said shopping cart.

7. In a checkstand system for self-service stores which have shopping carts supported on wheels for use by patrons in accumulating merchandise from different parts of the store and for transportation of the selected merchandise to the checkstand system for checking by a cashier, the combination comprising:

first counter means for receiving the selected merchandise from said shopping carts, said first counter means including means defining part of a boundary for a shopping cart unloading zone;

second counter means adjacent the shopping cart unloading zone and spaced from said first counter means a distance equal to at least the width of one of said shopping carts, said second counter means including means movable between first and second positions to alternatively define the remaining boundary for said shopping cart unloading zone and an exit passageway between said first counter means and second counter means; and whereby when a shopping cart is moved into said shopping cart unloading zone, said movable means on said second counter means may be moved to said first position to close the passageway between said first counter means and said second counter means and to define the remaining boundary for said shopping cart unloading zone to permit the selected merchandise in said shopping cart to be removed from said shopping cart and placed onto the first counter means, said movable means on said second counter means being further movable to said second position at the completion of the checking of the selected merchandise to open said passageway between said first counter means and said second counter means for purposes of permitting a removal of said shopping cart from said shopping cart unloading zone.

8. The device defined in claim 1, including also a trough arranged along the side of the first counter facing the second counter for reception of an upwardly opening bag whereby the cashier can from a single location remove merchandise from the shopping cart, check same by use of the cash register and place same in such bag.

9. The device defined in claim 1, including an upwardly opening, elongated trough arranged along the side of said first counter facing said second counter for the reception therein of an upwardly opening bag together with a compartment and dispensing means within said first counter adjacent said trough whereby a cashier may from a single station unload merchandise from a cart positioned within said unloading zone, check same by use of a cash register positioned on said supporting means, transfer a bag from said storage compartment into said trough and place such merchandise in said bag.